US012349256B2

(12) United States Patent
Van Delden et al.

(10) Patent No.: US 12,349,256 B2
(45) Date of Patent: Jul. 1, 2025

(54) DAPPLE LIGHTING

(71) Applicant: SIGNIFY HOLDING B.V., Eindhoven (NL)

(72) Inventors: Martinus Hermanus Wilhelmus Maria Van Delden, Venlo (NL); Paul Philip Thursfield, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 273 days.

(21) Appl. No.: 18/022,351

(22) PCT Filed: Aug. 19, 2021

(86) PCT No.: PCT/EP2021/072987
§ 371 (c)(1),
(2) Date: Feb. 21, 2023

(87) PCT Pub. No.: WO2022/043169
PCT Pub. Date: Mar. 3, 2022

(65) Prior Publication Data

US 2023/0319966 A1 Oct. 5, 2023

(30) Foreign Application Priority Data

Aug. 27, 2020 (EP) .................................... 20193116

(51) Int. Cl.
*H05B 47/155* (2020.01)
*H05B 45/10* (2020.01)
(Continued)

(52) U.S. Cl.
CPC ........... *H05B 47/155* (2020.01); *H05B 45/10* (2020.01); *H05B 45/20* (2020.01); *H05B 47/16* (2020.01); *H05B 47/17* (2020.01)

(58) Field of Classification Search
CPC ...... H05B 45/20; H05B 47/155; H05B 45/22; H05B 45/00; H05B 47/16; H05B 45/325;
(Continued)

(56) References Cited

U.S. PATENT DOCUMENTS

2010/0315012 A1 12/2010 Kim et al.
2012/0181932 A1 7/2012 De Hollan
(Continued)

FOREIGN PATENT DOCUMENTS

CN 103309137 A 9/2013
JP 2009117080 A 5/2009
(Continued)

*Primary Examiner* — Wei (Victor) Y Chan

(57) ABSTRACT

The invention provides artificial skylights rendering a realistic view to the sky, by providing natural feeling patterns, dynamics and tonalities of vertical illumination, and shadow patterns. Thereto a light generating system is provided to generate dynamic and recognizable content, and in particular dapple, by providing a light generation device combining a first layer of randomly (uncontrolled) operating, low intensity LEDS with a (nested) second layer of controlled higher intensity LEDs, thereby substantially reducing device and control costs. The ratio of randomly operating LEDs/ controlled LEDs is about 3:1.

15 Claims, 10 Drawing Sheets

(51) Int. Cl.
*H05B 45/20* (2020.01)
*H05B 47/16* (2020.01)
*H05B 47/17* (2020.01)

(58) Field of Classification Search
CPC ...... H05B 47/105; H05B 45/10; H05B 45/28; H05B 47/17; H05B 45/31
See application file for complete search history.

(56) References Cited

U.S. PATENT DOCUMENTS

| | | | |
|---|---|---|---|
| 2013/0257288 A1 | 10/2013 | Aurongzeb et al. | |
| 2017/0079109 A1* | 3/2017 | Matsui | H05B 45/375 |
| 2017/0190284 A1* | 7/2017 | Na | F21S 43/145 |
| 2017/0202157 A1 | 7/2017 | Onac et al. | |
| 2018/0077768 A1* | 3/2018 | Benner | H05B 45/20 |

FOREIGN PATENT DOCUMENTS

| | | |
|---|---|---|
| WO | 2009109387 A1 | 9/2009 |
| WO | 2020053095 A1 | 3/2020 |

* cited by examiner

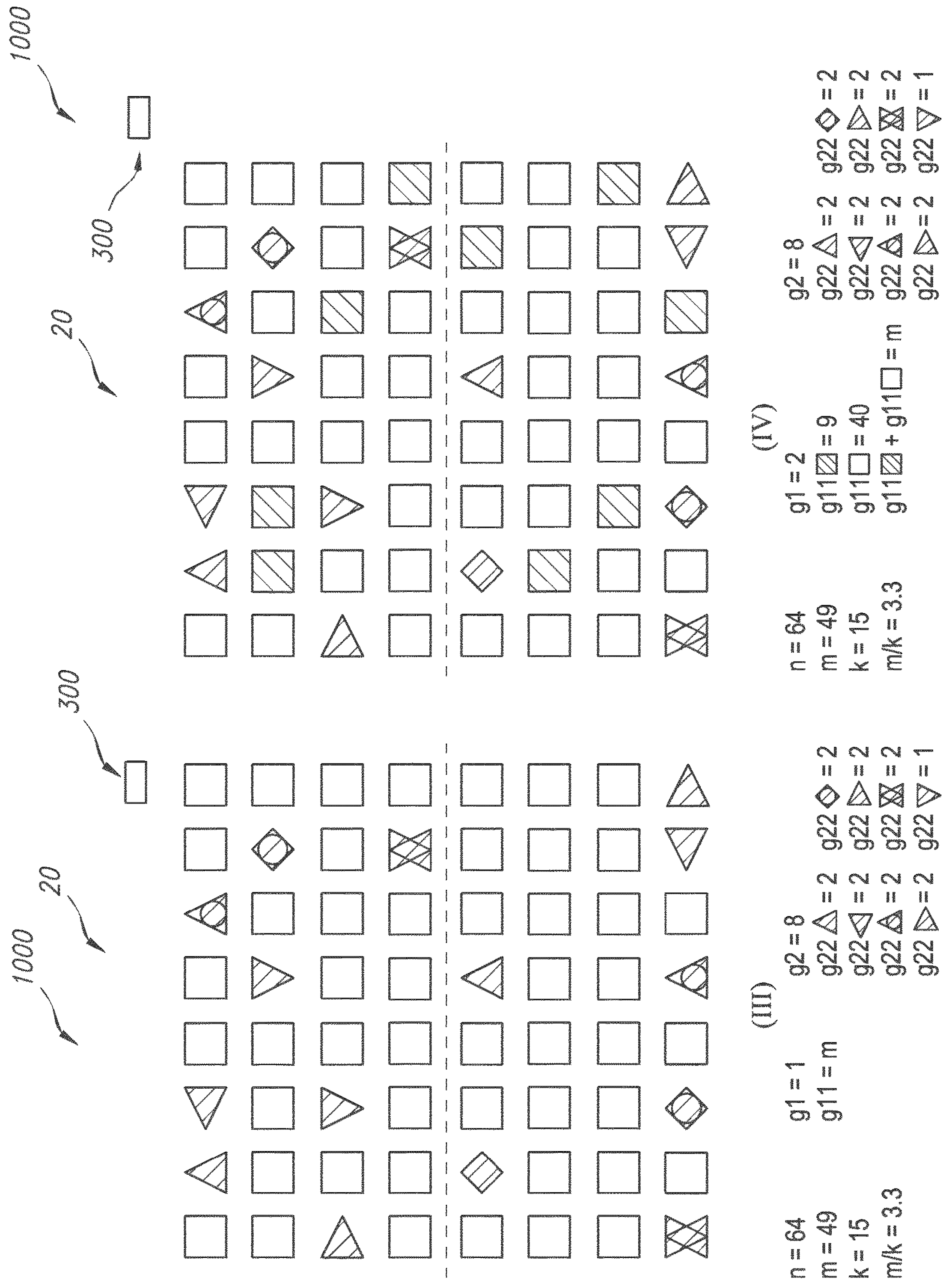
FIG. 1A continuation

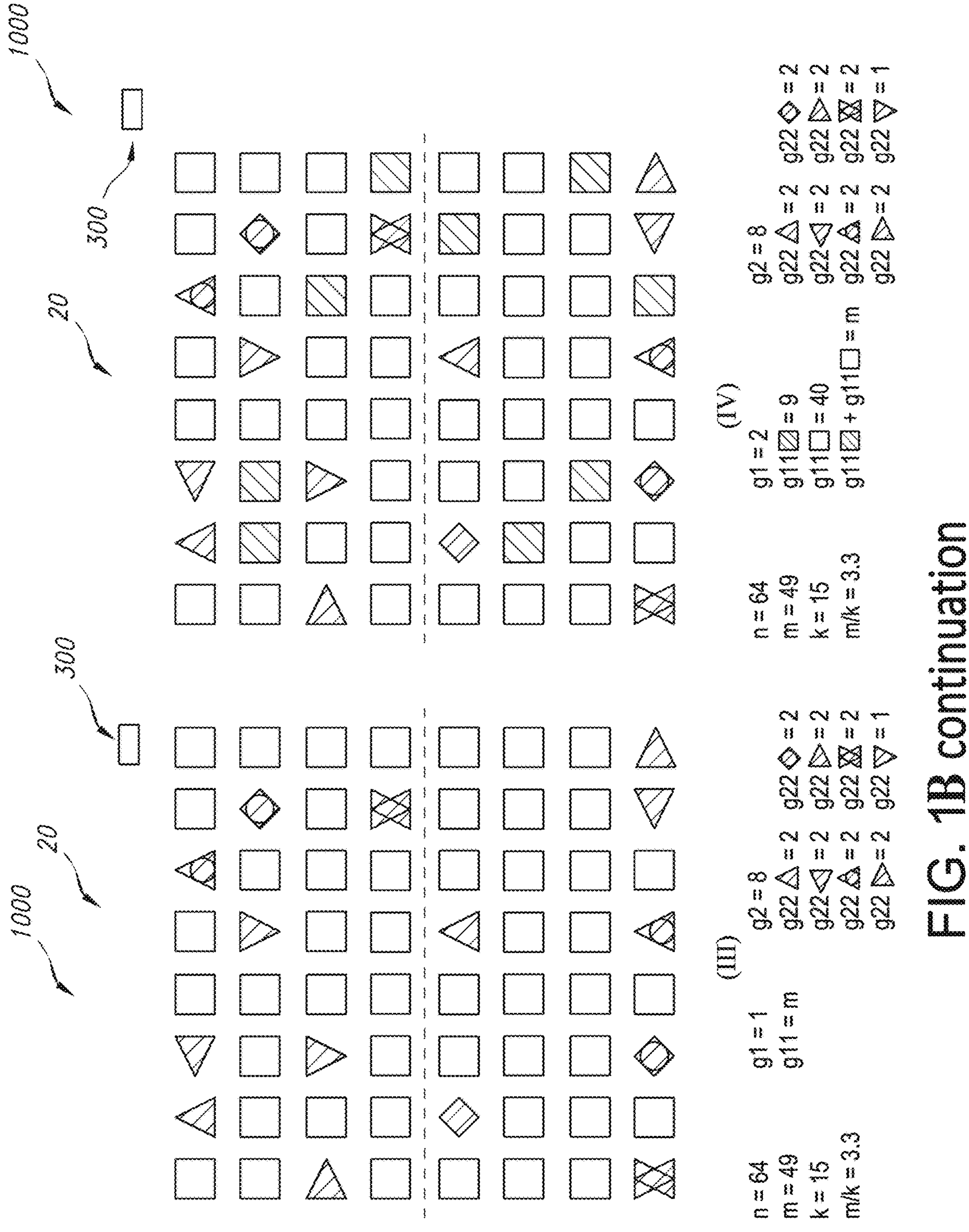
FIG. 1B continuation

DAPPLE LIGHTING

CROSS-REFERENCE TO PRIOR APPLICATIONS

This application is the U.S. National Phase application under 35 U.S.C. § 371 of International Application No. PCT/EP2021/072987, filed on Aug. 19, 2021, which claims the benefit of European Patent Application No. 20193116.9, filed on Aug. 27, 2020. These applications are hereby incorporated by reference herein.

FIELD OF THE INVENTION

The invention relates to a light generating system and to a lighting device (comprising such light generating system). The invention also relates to the use of such light generating system or lighting device.

BACKGROUND OF THE INVENTION

Matrix lighting is known in the art. US2013/0257285, for instance, describes a light fixture comprising: a matrix; a circuit board supported by the matrix; a plurality of electrical sockets fixedly coupled to the matrix and forming a matrix of electrical sockets, wherein the circuit board has conductors between the sockets to provide one or more sets of series connections of the sockets; a detection circuit associated with each socket to detect inoperative light emitting diode modules; and a transmitter coupled to the detection circuits for transmitting information identifying the array as having at least one inoperative light emitting diode plugged into a socket.

SUMMARY OF THE INVENTION

In current times a lot of people are indoors for the largest part of their work day. In several countries, it is defined by law that every employee should have access to natural daylight in their work environment. Natural daylight is good for your health and connects you to the outside world. It can provide information about the current time and weather conditions. However, as the population expands it can be expected that more of the spaces that we are in during the day will not have direct access to daylight.

The capability to display dynamic and natural feeling content at (locally) different rates, scales and resolution surprisingly appears to be an important aspect of a light generating system. This may offer an opportunity to add a semantic meaning more easily to the content played by the light generating system in using specific colors, dynamics and patterns, for example mimicking the shadow play of the sun's light rays falling through a deck of (moving) tree leaves. Other examples of natural feeling content may be the patterns and color gradients of the natural sky, for example made visible at indoor surfaces such as walls. Such effects may be created with matrix based systems, such as beamers or arrays of LEDs. However, such system are relatively complex and also control may be relatively complex. This has disadvantages, as the more complex a system, the more costs may be involved and the larger the chance on failures may be.

Hence, it is an aspect of the invention to provide an alternative light generating system (and/or lighting device), which preferably further at least partly obviates one or more of above-described drawbacks. The present invention may have as object to overcome or ameliorate at least one of the disadvantages of the prior art, or to provide a useful alternative. Yet further, it is an aspect of the invention to provide an alternative light generating system (and/or lighting device) which may create a dapple effect with lighting, which preferably further at least partly obviates one or more of above-described drawbacks.

In a first aspect, the invention provides a light generating system ("system") comprising (i) an array of n light generating devices ("devices" or "lighting devices"), and (ii) a control system configured to control the light generating devices. Especially, in embodiments $n \geq 20$. In embodiments, the array of n light generating devices comprises m first light generating devices and k second light generating devices. Especially, the second light generating devices may be configured in an at least partly random arrangement (within the array of plurality of light generating devices). Or stated in other words, the second light generating devices are disposed in an at least partly random arrangement within the array of plurality of light generating devices. The light generating device may have the feature that the second light generating devices are disposed randomly within the array of plurality of light generating devices. In specific embodiments, $m \geq 10$. Further, in specific embodiments $k \geq 3$. Especially, in embodiments $1 \leq m/k \leq 10$, such as $2 \leq m/k \leq 5$. Especially, the first light generating devices are configured to generate first device light and the second light generating devices are configured to generate second device light. In embodiments, in an operational mode the control system may be configured to control g1 first groups of the first light generating devices. Further, in embodiments, in the operational mode the control system may be configured to individually control g2 second groups of the second light generating devices. Yet further, in embodiments, in the operational mode a lighting parameter of the second device light of respective second groups of second light generating devices of q2 second groups of the second light generating devices may change mutually non-synchronically with time. Especially, in embodiments $1 \leq g1 < b$, wherein $b = g2$. In embodiments, each first group of the first light generating devices may comprise g11 first light generating devices. In specific embodiments, g11 for each first group may individually be selected from the range of $b \leq g11 \leq m$, and especially the sum of all g11's may be m. Further, especially in embodiments $2 \leq g2 \leq k$. Yet further, in embodiments each second group of the second light generating devices may comprise g22 second light generating devices. Especially, in embodiments g22 for each second group may individually be selected from the range of $1 \leq g22 \leq k-1$, and especially the sum of all g22's may be k. Further, in specific embodiments $2 \leq q2 \leq k$. Therefore, especially the invention provides in embodiments a light generating system comprising (i) an array of n light generating devices, wherein $n \geq 20$, and (ii) a control system configured to control the light generating devices, wherein: the array of n light generating devices comprises m first light generating devices and k second light generating devices; wherein the second light generating devices are configured or disposed in an at least partly random arrangement within the array of plurality of light generating devices; wherein $m \geq 10$; $k \geq 3$; and $2 \leq m/k \leq 5$; wherein the first light generating devices are configured to generate first device light and wherein the second light generating devices are configured to generate second device light; and wherein in an operational mode: (I) the control system is configured to control g1 first groups of the first light generating devices, wherein $1 \leq g1 \leq b$, wherein $b = g2$, wherein each first group of the first light generating devices comprises g11 first light generating devices, wherein g11 for each first group is individually selected from the range of b≤g11≤m, and wherein the sum of all g11's is m; (II) the control system is configured to individually control g2 second groups of the second light generating devices, wherein 2≤g2≤k, wherein each second group of the second light generating devices comprises g22 second light generating devices, wherein g22 for each second group is individually selected from the range of 1≤g22≤k−1, and wherein the sum of all g22's is k; and (III) a lighting parameter of the second device light of respective second groups of second light generating devices of q2 second groups of the second light generating devices changes mutually non-synchronically with time, wherein 2≤q2≤k.

With such system it is possible to create dapple effects with lighting, whereas the system may be relatively simple. Driver and or electronics complexity can be reduced, while a realistic dapple effect with e.g. daylight may be mimicked.

The invention may in embodiments be based on a relative simple concept wherein a first part of an array comprising a plurality of light generating devices may have a first function, like a background lighting function. This first part of the array may comprise a plurality of light generating devices which may be controlled as a group, instead of individually controlling all light generating devices within that first part of the array. A second part of the array (comprising the plurality of light generating devices) may have a second function, especially a dapple effect creation function on the background light. This second part of the array may comprise a plurality of light generating devices, though in general a smaller number than the light generating devices within the first part of the array. The plurality of the light generating devices of the second part may especially individually be controlled. Further, the light generating devices of the second part of the array may especially be configured at least partially random over the array. This allows twinkling or sparkling, which may change with time, and which may also spatially change with time. In this way, a dapple effect with lighting may be created. This relatively simple concept may be slightly more complex in that in embodiments (a) there may be more than one groups within the first part of the array, which groups may be individually controlled, and/or (b) there may be subsets of more than one light generating devices within the second part of the array, which subsets are individually controlled. In general, the number of the one or more groups within the first part of the array may be smaller than number of individually controlled subsets comprising one or more light sources within the second part.

As indicated above, the light generating system comprises (i) an array of n light generating devices and (ii) a control system configured to control the light generating devices. The invention also provides the array as such.

Each light generating device comprises a light source. Especially, each light generating device may be configured to provide a pixel (optionally in combination with further elements, like optics). This may be in the near field, like on a screen (of a device), or in the far field, like when using e.g. a beamer or other projection device. The pixel, be it in the far field or near field, may be small, e.g. smaller than 1 $mm^2$, but may also be larger, like especially in the near field, like at least 1 $cm^2$, such as selected from the range of 1-100 $cm^2$, at a distance selected from the range of 0.10-50 m from a projection device. In specific embodiments, the projection device may be a short-throw projection device (wherein the distance may in specific embodiments may be 0.1-0.35 m). However, other dimensions, such as for other type of projection devices, may also be possible, such as 1-50 m.

Hence, in specific embodiments the system may comprise a screen. On the screen, the light generating devices, optionally together with optics, provide pixels.

The term "light source" may in principle relate to any light source known in the art. It may be a conventional (tungsten) light bulb, a low pressure mercury lamp, a high pressure mercury lamp, a fluorescent lamp, a LED (light emissive diode). In a specific embodiment, the light source comprises a solid state LED light source (such as a LED or laser diode). The term "light source" may also relate to a plurality of light sources, such as 2-2000 (solid state) LED light sources; though much more may be used (see also below). Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light semiconductor light source may be configured on the same substrate. In embodiments, a COB is a multi LED chip configured together as a single lighting module.

The light source has a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes form the light exit surface of the light source.

The term "light source" may refer to a semiconductor light-emitting device, such as a light emitting diode (LEDs), a resonant cavity light emitting diode (RCLED), a vertical cavity laser diode (VCSELs), an edge emitting laser, etc. . . . . The term "light source" may also refer to an organic light-emitting diode, such as a passive-matrix (PMOLED) or an active-matrix (AMOLED). In a specific embodiment, the light source comprises a solid-state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module.

The term "light source" may also relate to a plurality of (essentially identical (or different)) light sources, such as 2-2000 solid state light sources though much more may be used (see also below). In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

In embodiments, the light source may be configured to provide primary radiation, which is used as such, such as e.g.

a blue light source, like a blue LED, or a green light source, such as a green LED, and a red light source, such as a red LED.

In other embodiments, however, the light source may be configured to provide primary radiation and part of the primary radiation may be converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. In other embodiments, the luminescent material may be configured at some distance ("remote") from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride ($Sm:CaF_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate $Nd:YCa_4O(BO_3)_3$ or Nd:YCOB, neodymium doped yttrium orthovanadate ($Nd:YVO_4$) laser, neodymium glass (Nd:glass) laser, neodymium YLF (Nd:YLF) solid-state laser, promethium 147 doped phosphate glass ($147Pm^{3+}$:glass) solid-state laser, ruby laser ($Al_2O_3:Cr^{3+}$), thulium YAG (Tm:YAG) laser, titanium sapphire (Ti:sapphire; $Al_2O_3:Ti^{3+}$) laser, trivalent uranium doped calcium fluoride ($U:CaF_2$) solid-state laser, Ytterbium doped glass laser (rod, plate/chip, and fiber), Ytterbium YAG (Yb:YAG) laser, $Yb_2O_3$ (glass or ceramics) laser, etc.

In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light. The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The light source is especially configured to generate light source light having an optical axis (O), (a beam shape,) and a spectral power distribution. The light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments <2° (FWHM), more especially <1° (FWHM), most especially <0.5° (FWHM). Hence, <2° (FWHM) may be considered (highly) collimated light source light. Optics may be used to provide (high) collimation (see also above).

As indicated above, each light generating device comprises one or more light sources. Even more especially, the light generating devices comprise solid state light sources.

Hence, each light generating device may comprise one or more solid state light sources, such as LEDs.

The light generating device is configured to generate device light. The light source is configured to generate light source light. The light generating device may in embodiments comprise a luminescent material configured to convert part of the light source light into luminescent material light. Hence, the device light may comprise one or more of light source light and luminescent material light.

In embodiments, one or more, especially a plurality of the plurality of light generating devices may comprise two or more light sources. In this way, it may e.g. be possible to control optical parameters of the device light of the light generating device, such as especially color point. Hence, in embodiments one or more, especially a plurality of the plurality of light generating devices have a color tunable color point of the respective device light.

Alternatively or additionally, two or more light generating devices, especially two or more groups of each a plurality of light generating devices, may be configured to provide respective device light having different color points. Hence, in such embodiments the color points may be fixed, but may differ between the devices from the different groups. In specific embodiments, colors or color points of a first type of light and a second type of light may be different when the respective color points of the first type of light and the second type of light differ with at least 0.01 for u' and/or with at least 0.01 for v', even more especially at least 0.02 for u' and/or with at least 0.02 for v'. In yet more specific embodiments, the respective color points of first type of light and the second type of light may differ with at least 0.03 for u' and/or with at least 0.03 for v'. Here, u' and v' are color coordinate of the light in the CIE 1976 UCS (uniform chromaticity scale) diagram.

Alternatively or additionally, two or more light generating devices, especially two or more groups of each a plurality of light generating devices, may be configured to provide respective device light having different correlated color temperatures (CCT). Hence, in such embodiments the CCTs may be fixed, but may differ between the devices from the different groups. Hence, in embodiments two or more light generating devices may be configured to generate white light. The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL. In specific embodiments, correlated color temperatures (CCT) of a first type of light and a second type of light may be different when the respective CCTs of the first type of light and the second type of light differ with at least 500 K, such as at least 750 K, like in embodiments at least 1000 K.

Hence, two or more light generating devices, especially two or more groups of each a plurality of light generating devices, may have different color points and/or two or more light generating devices, especially two or more groups of each a plurality of light generating devices, may have a controllable color point (and thus in specific embodiments a controllable correlated color temperature).

As indicated above, the system may comprise an array of the light generating devices. The term "array" may refer in embodiments to a 1D array and may refer in other embodiments to a 2D array. In yet further specific embodiments, the term "array" may refer in embodiments to a 3D array, such as in embodiments 2-3 2D arrays which are stacked. In specific embodiments, there may be a 3D array in that a first layer of light is in the physical background with respect to a plane of an arrangement of a second light layer, or vice versa. Thus the spot size of the first layer may be different from that of the second layer (without the need for optics). The second layer may comprise of LEDs on e.g. posts or (bend) wires, or vice versa.

The light generating devices in the array may be configured with regular distances, i.e. with a pitch, or with pitches (in different directions in the case of a 2D or a 3D array). Hence, in embodiments the array may be a regular array. Note that a regular array may still include a random arrangement of specific types of light generating devices (see further below). The array of light generating devices may in embodiments also be an irregular array or a combination of a regular and irregular arrangement. For instance, the array may comprise a regular arrangement of clusters of irregularly arranged light generating devices, or the array may comprise an irregular arrangement of clusters of regularly arranged light generating devices. Especially, in embodiments the array comprises a regular arrangement of the light generating devices.

The system comprises a plurality of light generating devices (configured in the array). As indicated above, the system may comprise n light generating devices. In embodiments, $n \geq 10$, more especially, however, $n \geq 20$. For instance, in embodiments $n \geq 40$. However, in embodiments, the number of light generating devices may be much larger, like $n \geq 100$, or even $n \geq 1000$, such as in specific embodiments even $n \geq 10{,}000$, or even $n \geq 100{,}000$. For instance, when micro LEDs are used, then number of light generating devices may be relatively high (though this is not necessarily the case, as a plurality of micro LEDs may be comprised by a single light generating device). As in embodiments each light generating device may provide (optionally in combination with further elements, like optics) a pixel, a practical upper limit may e.g. be about 1.109, such as 1.108, such as up to about 5.107. Presently, with HDTV e.g. in the order of 2.107 may already be possible.

Further, it is of course also possible to combine systems or to use a system with a plurality of arrays (see also above). Hence, in specific embodiments the system may comprise a plurality of arrays of light generating devices. This may yet further increase the number of light generating devices. Such arrays may be arranged adjacent to each other, like in a 1D or 2D arrangement of arrays. For instance, a 1D arrangement of a plurality of arrays may be applied in a hallway. Or, for instance, a 2D arrangement of screens may be used on a wall. Or, for instance, an arrangement of beamers may be used to provide a 1D or 2D arrangement of arrays.

As indicated above, in the array, there may basically be two types of light generating devices: those of a first type, which may be controlled as relatively large group(s) of light generating devices, and those of a second type, which may be comprised by—in general—smaller groups that are individually controlled. These two types of light generating devices may coincide with the above-mentioned different types of light generating devices, but this is not necessarily the case.

Hence, in embodiments the array of n light generating devices comprises m first light generating devices and k second light generating devices. Especially, in embodiments the second light generating devices are configured or disposed in an at least partly random arrangement within the array of plurality of light generating devices, the second light generating devices may be fully randomly disposed within the array of plurality of light generating devices. Hence, whether or not the array is a regular array, especially the second light generating devices are in an embodiment not configured in a regular arrangement. The arrangement of second light generating devices may in embodiments also be an irregular arrangement or a combination of a regular and irregular arrangement. For instance, the arrangement may comprise a regular arrangement of clusters of irregularly arranged second light generating devices, or the arrangement may comprise an irregular arrangement of clusters of regularly arranged second light generating devices. In specific embodiments, the partly random arrangement (of second light generating devices) comprises a random arrangement or a quasi-random arrangement. Hence, in embodiments the arrangement of the second light generating devices may essentially have no regularity. Quasi-random arrangements may also be indicated as low-discrepancy arrangements, due to their common use as a replacement of uniformly distributed random numbers. The "quasi" modifier is used to denote more clearly that the values of a low-discrepancy arrangement are neither random nor pseudorandom, but such arrangements share some properties of random variables and in certain applications such as the quasi-Monte Carlo method their lower discrepancy is an important advantage. In embodiments, a quasi-random arrangement may be provided by dividing an (regular) arrangement in a subset of arrangements, which may be of about equal size (though this is not necessarily the case), and randomly selected position within each subset of the arrangements the positions of the second light generating devices. Especially, the subset of arrangements includes at least four subsets, such as at least eight.

Especially, in embodiments $m \geq 10$ and $k \geq 3$. As indicated above, however, these numbers may be much larger in embodiments. Especially, the number of first light generating devices is equal to or larger than the number of second light generating devices. Hence, in embodiments $m/k \geq 1$, even more especially $m/k \geq 1$, such as $m/k \geq 1.5$, like especially $m/k \geq 2$. However, to obtain dapple, the number of first light generating devices may especially be not an order of magnitude larger than the number of second light generating devices. Hence, in embodiments $m/k \leq 10$, even more especially $m/k \leq 8$, such as $m/k \leq 5$. Hence, in specific embodiments $1 \leq m/k \leq 10$, such as $1 \leq m/k \leq 10$, more especially $2 \leq m/k \leq 5$. In specific embodiments, $3 \leq m/k \leq 4$. Hence, in yet further specific embodiments, $n \geq 40$, $3 \leq m/k \leq 4$. Further, in embodiments $b=12$ (see also below).

The first light generating devices are configured to generate first device light and the second light generating devices are configured to generate second device light. Note that the first light generating devices may be comprised by one or more different groups. Further, note that the second light generating devices may be comprised by one or more (other) different groups. Further, note that one or more, especially two or more, first light generating devices may be configured to generate first device light having different spectral properties than the second device light generated by one or more, especially two or more, second light generating devices. However, this is not necessarily the case (see also below).

Both the first light generating devices and the second light generating devices may be controlled by the control system. To this end, the system comprises a control system.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability). Hence, in embodiments, the control system may control in dependence of one or more of an input signal of a user interface, a sensor signal (of a sensor), and a timer. The term "timer" may refer to a clock and/or a predetermined time scheme.

In embodiments, in an operational mode, the control system is configured to control $g_1$ first groups of the first light generating devices. The number of first groups may be one (see above under the relatively simple concept). However, the number of first groups may in specific embodiment also be larger than 1. In specific embodiments, $1 \leq g_1 \leq b$, wherein especially $b = g_2$. For the number g2, see below.

Especially, each first group of the first light generating devices comprises $g_{11}$ first light generating devices. Further, $g_{11}$ for each first group is individually selected from the range of $b \leq g_{11} \leq m$. Especially, the sum of all $g_{11}$'s is m. Hence, when there is a single first group, i.e. $g_1 = 1$, then this first group includes m first light generating devices. When there are more than one first groups, the respective number of first light generating devices $g_{11}$ may be the same or may differ, or two or more may be the same and/or two or more may be different. Therefore, when g1 is two or more, two or more of the $g_{11}$'s may be the same and/or two or more of the $g_{11}$'s may mutually differ.

In general, the number of first groups is smaller than the number of second groups. Hence, especially $g_1 < g_2$.

As indicated above, the light generating devices of each first group may be controlled as group. Hence, in general the first light generating devices within a first group may essentially be the same. First light generating devices of different first groups may mutually differ, though in embodiments first light generating devices of two or more different first groups may also essentially be the same.

When the first light generating devices of a first group are controlled as group, one or more lighting parameters may synchronically change (during the operational mode).

Especially, in embodiments the first light generating devices of each first group may be configured in a single LED string. In this way the first light generating devices of a first group may be controlled as group. Note that when there are more than one first groups, these first groups may be controlled individually, whereas the respective group members (i.e. the first light generating devices of the respective first group) are controlled as group. In embodiments, each first group may comprise a LED string with a plurality of first light generating devices.

Yet further, in embodiments, in the operational mode the control system is configured to individually control g2 second groups of the second light generating devices.

Whereas (in the operational mode) in embodiments there may be a single first group, in general there are at least two second groups. Further, whereas (in the operational mode) in embodiments the respective second groups may each include a single second light generating device, in general the one or more first groups each include more than one first light generating device.

Hence, the number of individually controlled second groups is (in the operational mode) in embodiments at least two and may be at maximum the total number of second light generating devices. Hence, in the latter embodiment each second light generating device is individually controlled. Therefore, (in the operational mode) in embodiments $2 \leq g_2 \leq k$. As indicated above, in embodiments $b = g_2$. In specific embodiments, b may not be larger than 12. Therefore, in yet further specific embodiments, $n \geq 40$, $3 \leq m/k \leq 4$, and especially $b = 12$.

Especially, each second group of the second light generating devices comprises $g_{22}$ second light generating devices, wherein $g_{22}$ for each second group is individually selected from the range of $1 \leq g_{22} \leq k-1$. The condition of $g_{22} \leq k-1$ may apply as there may especially at least two individually controlled second groups. Especially the sum of all $g_{22}$'s is k. When there are two or more second groups, the respective number of second light generating devices $g_{22}$ may be the same or may differ, or two or more may be the same and/or two or more may be different. Therefore, two or more of the $g_{22}$'s may be the same and/or two or more of the $g_{22}$'s may mutually differ.

In general, the number of second groups is larger than the number of first groups. Hence, especially $g_1 < g_2$.

As indicated above, also the light generating devices of each second group are controlled as group. Hence, in general the second light generating devices within a second group may essentially be the same. Second light generating devices of different second groups may mutually differ, though in embodiments second light generating devices of two or more different second groups may also essentially be the same.

When the second light generating devices of a second group are controlled as group, one or more lighting parameters may synchronically change (during the operational mode).

Especially, in embodiments the second light generating devices of each second group may be configured in a single LED string. In this way the second light generating devices of a second group may be controlled as group. Note that when there are two or more second groups, these second groups may be controlled individually, whereas the respective group members (i.e. the second light generating devices of the respective second group) are controlled as group.

Yet further, in embodiments, in the operational mode a lighting parameter of the second device light of respective second groups of second light generating devices of q2 second groups of the second light generating devices may change mutually non-synchronically with time, wherein in specific embodiments $2 \leq q2 \leq k$.

It may be that, in embodiments, over time all second light generating devices have a changing lighting parameter over time. However, this may in embodiments also apply to a subset of the second light generating devices. This subset (of two or more second light generating devices) may also change over time.

As indicated above, there may be two or more second groups of second light generating devices, with each group comprising at least one second light generating device. Hence, in embodiments in the operational mode a lighting parameter of the second device light of respective second groups of second light generating devices of q22 second light generating devices changes mutually non-synchronically with time, wherein especially $2 \leq q22 \leq g_2$.

The (non-synchronically) change of a lighting parameter may in embodiments refer to a change in one or more of intensity and color point. Instead of the term "color" one may also use the term "hue". Alternatively or additionally, the (non-synchronically) change of the lighting parameter may in embodiments refer to a change in saturation. Hence, the term "lighting parameter" may also refer to a plurality of (different) lighting parameters.

Especially, the change may be visible to the human eye. This may in embodiments also imply that the time the change takes is long enough to be seen by the human eye, but not too long such that essentially no change is seen. Alternatively or additionally, this may in embodiments imply that the time periods in of the unchanged state and of the changed state are long enough to be seen by the human eye, but not too long such that essentially no change is seen. Hence, relevant times may be the changing time, the time period of the unchanged state, and the time period of the changed state. The unchanged state may essentially be the state (or stage) before the change.

As a rule of thumb, in embodiments one or more of (i) the changing time, (ii) the time period of the unchanged state, and (iii) the time period of the changed state may be selected from the range of 0.5-600 seconds, such as 0.5-300 seconds, like especially 1-300 seconds. However, other values may also be possible, such as at maximum about 600*q2, like at maximum 300*q2 (see also below). Hence, the terms "unchanged state" and "changed state" especially refer to states before and after the changing time. A lighting parameter in these states may be different, though during the respective state the lighting parameter may in embodiments essentially be constant.

As indicated above, especially the change may be visible to the human eye. Additionally or alternatively, this may in embodiments imply that the change is large enough.

As a rule of thumb, in embodiments the change is at least about a value equal to 5% of a maximum value. For instance, referring to color points, the maximum value of u' and v' are about 0.6, respectively. Hence, a change in color point may be at least 0.03 in one or more of u' and v'. For instance, referring to an intensity, the maximum value may be $I_{max}$. Hence, a change in intensity may be at least a value equal to $0.05*I_{max}$.

As indicated above, in embodiments in the operational mode the lighting parameter of the second device light of respective second groups of second light generating devices of q2 second groups of the second light generating devices changes mutually non-synchronically with time. Hence, for at least q2 groups applies that the change in time of a specific lighting parameter has not an identical time-dependent progress. Here, "identical time-dependent progress" may refer to time-dependent curve of the specific lighting parameter which fully overlap in time. Minor deviations in value and time, especially smaller than about 2.5% of a maximum values, such as especially smaller than about 1% may however in embodiments be possible. Hence, there may e.g. be an offset in time which is 2.5% of a period, or a difference in intensity which is at maximum 2.5% of a maximum value, which may be not or less visible to the human eye, and/or which may be considered as acceptable for a (slight) variation on aspect of the mutually non-synchronically with time change. Note that this does not necessarily exclude that one second group changes a first lighting parameter, such as intensity, in a periodic manner, and another second group changes a second lighting parameter, like e.g. u' or v' in essentially the same periodic manner. In specific embodiments, in embodiments in the operational mode the lighting parameter of the second device light of respective second groups of second light generating devices of each second group of the second light generating devices changes mutually non-synchronically with time.

As indicated above, the lighting parameter may thus in embodiments be selected from the group of (i) intensity and (ii) color point.

Here below, some further embodiments are described.

As indicated above, in specific embodiments, there may be a single first group of first light generating devices and/or there may be only individually controlled second light generating devices (i.e. each second light generating device forms its own second group). Hence, in embodiments of the light generating system, in the operational mode: (I) the control system may be configured to control $g_1$ first groups of the first light generating devices, wherein $g_1=1$, wherein the first group of the first light generating devices comprises $g_{11}$ first light generating devices, wherein $g_{11}=m$; and (II) the control system may be configured to individually control $g_2$ second groups of the second light generating devices, wherein $g_2=k$, wherein each second group of the second light generating devices comprises $g_{22}$ second light generating devices, wherein $g_{22}=1$.

Above (and also below), attention has been paid to the second light generating devices of the second groups. With respect to the first light generating devices, some embodiments are described below.

In embodiments, in the operational mode, the first light generating devices (of a first group) may be configured to provide colored first device light and the second light generating devices (of a second group) may be configured to generate white second device light, or colored second device light having a lower saturation than the first device light. For instance, in this way the effect of sunlight on water or sunlight through leaves, etc., may be mimicked.

Alternatively or additionally, in yet other embodiments in the operational mode, the second light generating devices (of a second group) may be configured to provide colored second device light and the first light generating devices (of a first group) may be configured to generate white first device light, or colored first device light having a lower saturation than the second device light.

Alternatively or additionally, in yet other embodiments in the operational mode, the second light generating devices (of a second group) may be configured to provide white second device light and the first light generating devices (of a first group) may be configured to generate also white first device light, but having a different correlated color temperature.

Hence, in embodiments the first device light of a first group may differ during the operational mode from the second device light of a second group in one or more of color point and correlated color temperature. Definition of differences (in color point or CCT) are given above.

When there are more than one first groups, this may at least apply to one first group, especially to a majority of the first groups when there are two or more first groups, such as in embodiments all first groups.

In embodiments, the first device light of the first devices of a first group may be used as background lighting, relative to the second light of one or more second group of second light generating devices. Over the array, in embodiments the background may differ. Hence, in embodiments there may be two or more first groups of first light generating devices, wherein in the operational mode the first device light of different first groups may mutually differ in one or more of color point and correlated color temperature. Alternatively or additionally, two or more first groups of first light generating devices in the operational mode the first device light of different first groups may mutually differ in intensity (see also below).

The first light generating devices and second light generating devices may during the operational mode differ in color point and/or CCT (and/or intensity (see also below)), but may alternatively or additionally also differ in time-dependent behavior.

As indicated above in relation to the second light generating devices, relevant times may be the changing time, the time period of the unchanged state, and the time period of the changed state. When comparing the changing time, the time period of the unchanged state, and the time period of the changed state of the first device light of at least a first group with the changing time, the time period of the unchanged state, and the time period of the changed state of second device light of at least a second group, one or more, especially two or more, such as all three of (i) the changing time, (ii) the time period of the unchanged state, and (iii) the time period of the changed state may be longer.

When there are more than one first groups, this may at least apply to one first group, especially to a majority of the first groups when there are two or more first groups, such as in embodiments all first groups.

In embodiments there may be two or more first groups of first light generating devices wherein in the operational mode the first device light of different first groups may mutually differ in in time-dependent behavior.

The first light generating devices and second light generating devices may during the operational mode differ in color point or CCT, and/or time-dependent behavior, but may alternatively or additionally also differ in intensity.

As indicated above, in embodiments the first device light may be used as a kind of background lighting, from which the second device light may blend in. Hence, in embodiments the first device light (of at least one first group) may differ in intensity from the second device light (of at least one second group).

In specific embodiments during at least part of a first operational mode period of the operational mode, the first light sources may have a first intensity $I_1$ and one or more of the second light sources may have a second intensity $I_2$, wherein $0.75 \leq I_2/I_1 \leq 15$.

Here, the intensities may refer to one or more of luminous flux ($\Phi_v$), illuminance ($E_v$), and radiance ($L_{e,\Omega}$). In embodiments, the first intensity and the second intensity may refer to radiances. In yet other embodiments, the first intensity and the second intensity may refer to illuminances. Hence, in specific embodiments the values of $I_2$ and $I_1$ may be in lux. In yet other embodiments, the first intensity and the second intensity may refer to luminous fluxes.

Note that the ratio $I_2/I_1$ may in embodiments vary over the time of the at least part of a first operational mode period.

In embodiments, the ratio may be chosen in dependence of ambient light level, e.g. whether or not solar light is available in a space, such as a room, hall, or hallway. For instance, on a sunny day, larger intensity differences may be useful. In specific embodiments, during the at least part of the first operational mode period $5 \leq I_2/I_1 \leq 15$. On a cloudy day, the intensity differences may be smaller. In specific embodiments, during the at least part of the first operational mode period $0.75 \leq I_2/I_1 \leq 1.5$. Especially, in embodiments over the at least part of a first operational mode period $I_2/I_1 > 1$, even more especially $I_2/I_1 > 1.1$. Hence, in specific embodiments $I_2/I_1$ may depend upon a sensor signal, such as a sensor signal of an ambient light sensor.

Nature may come with dynamics where flux, intensity and/or color point may be subject to change depending on the season, time of day and weather conditions. Modulation may amongst others be due to atmospheric conditions. Intuitively, humans may have a feel for which changes are natural.

As indicated above, the first light generating devices and second light generating devices may during the operational mode differ in time-dependent behavior. Hence, in specific embodiments during at least part of the first operational mode period of the operational mode the first intensity $I_1$ and the second intensity $I_2$ may differ in temporal behavior.

As indicated above, the first light generating devices and second light generating devices may during the operational mode differ in time-dependent behavior, but may alternatively or additionally also differ in one or more of color point (or CCT) and in intensity. Hence, in specific embodiments during at least part of a second operational mode period of the operational mode the first device light and the second device light differ in one or more of (i) intensity and (ii) color point. The second operational mode period may overlap with the first operational mode period or may even be identical with the first operational mode period.

In embodiments, the lighting parameter may be an intensity of the second device light of respective second groups of second light generating devices of the q2 second groups of the second light generating devices, wherein the intensity has a maximum intensity $I_{max}$, wherein during at least part of a third operational mode period of the operational mode the control system is configured to sequentially vary the intensity of the second device light, between a lower intensity and a higher intensity, wherein the lower intensity and the higher intensity differ at least $0.05*I_{max}$, wherein the control system is configured to least partly randomly select the different second light sources (for sequentially varying the lighting parameters . . . ) and wherein a change from a lower value and a higher value or vice versa is executed in a time period in the range of 0.5-600 seconds, such as 0.5-300 seconds, like especially 1-300 seconds. The third operational mode period may overlap with one or more of the first operational mode period and the second operational mode period, or may even be identical with one or more of the first operational mode period and the second operational mode period.

Alternatively or additionally, in embodiments the lighting parameter may be a color point of the second device light of respective second groups of second light generating devices of the q2 second groups of the second light generating devices, wherein during at least part of a fourth operational mode period of the operational mode the control system is configured to sequentially vary the color point of the second device light, between different color points, wherein the different color points at least differ with one or more of (i) at least 0.03 for u' and (ii) at least 0.03 for v', wherein the control system is configured to least partly randomly select the different second light sources (for sequentially varying the lighting parameters . . . ), and wherein a change between the color points is executed in a time period in the range of 0.5-600 seconds, such as 0.5-300 seconds, like especially 1-300 seconds. The fourth operational mode period may overlap with one or more of the first operational mode period and the second operational mode period and the third operational mode, or may even be identical with one or more of the first operational mode period and the second operational mode period and the third operational mode.

Alternatively or additionally, in embodiments the lighting parameter of the second device light of respective second groups of second light generating devices of q2 second groups of the second light generating devices may change mutually non-synchronically with time, between a higher value and a lower value during a time period $\Delta t$, wherein $\Delta t$ for each of the respective q2 second groups of the second light generating devices may individually selected from the ranges of at least 0.5 seconds, such as at least 1 second, and at maximum q2*600, such as especially at maximum q2*300 seconds.

Referring to the first light generating devices as such, and the first device light, a lighting parameter of the first device light may thus also change over time. As indicated above, this may occur during longer periods, though that is not necessarily the case. Further, when there are two or more first groups, the lighting parameter of the first device light may periodically change with time simultaneously or non-synchronically, but especially in embodiments non-synchronically with the second device light of one or more second groups. Hence, in specific embodiments in the operational mode a lighting parameter of the first device light of (respective) one or more first groups of first light generating devices of q1 first groups of the first light generating devices may change mutually non-synchronically or mutually synchronically with time, or two or more may change mutually non-synchronically and two or more may change mutually synchronically with time.

However, especially the first device light of (respective) one or more first groups of first light generating devices of q1 first groups of the first light generating devices may change mutually non-synchronically with the second device light of respective second groups of second light generating devices of one or more, especially all, of the q1 first groups of the first light generating devices.

In embodiments, in embodiments one or more of (i) the changing time, (ii) the time period of the unchanged state, and (iii) the time period of the changed state of a lighting parameter of the first device light of (respective) one or more first groups of first light generating devices of q1 first groups of the first light generating devices may be at least 25%, such as at least 50% larger than one or more of (i) the changing time, (ii) the time period of the unchanged state, and (iii) the time period of the changed state of a lighting parameter of the second device light of (respective) one or more second groups of second light generating devices of q2 second groups of the second light generating devices.

Here below, some further embodiments of the light generating system are described.

In yet further specific embodiments, the light generating system may comprise a LED chip with micro-structured pixels, wherein the micro-structured pixels are defined by the light generating devices. This may allow a relatively compact design.

However, other embodiments may also be possible. For instance, instead of multiple-LED based light generating devices, also other types of devices may be applied, using the same principle as described herein. For instance, in embodiments the light generating system may comprise one or more of DLP, LCD, LCOS and MEMS based arrays. Such system may also provide a plurality of n pixels.

Digital Light Processing which employs a chip comprised of microscopic mirrors and a spinning color wheel to generate an image. LCD projectors opt for liquid crystal displays rather than physical moving parts as can be found in DLP projectors. LCoS on the other hand stands for liquid crystal on silicon and is a sort of DLP-LCD hybrid which uses liquid crystal chips and a mirrored backing. According to Wikipedia, Micro-electro-mechanical systems (MEMS), also written as micro-electro-mechanical systems (or microelectronic and microelectromechanical systems) and the related micro-mechatronics and microsystems constitute the technology of microscopic devices, particularly those with moving parts. They merge at the nanoscale into nanoelectromechanical systems (NEMS) and nanotechnology. MEMS may be made up of components between 1 and 100 micrometers in size (i.e., 0.001 to 0.1 mm), and MEMS devices generally range in size from 20 micrometers to a millimeter (i.e., 0.02 to 1.0 mm), although components arranged in arrays (e.g., digital micromirror devices) can be more than 1000 $mm^2$.

Further, optics may be applied. For in embodiments one or more of (i) a diffuser configured downstream of the light generating devices, and (ii) one or more lenses configured downstream of one or more of the light generating devices. When one or more lenses are applied, they may all have the same shape. However, in specific embodiments, two or more of a plurality of lenses (configured downstream of a plurality of the light generating devices, respectively) may have different shapes. This may further add to the randomness. The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

In a further aspect, the invention provides a lighting device selected from the group of a lamp, a luminaire, a projector device, comprising the light generating system as defined herein. Hence, the lighting device may comprise the light generating system, and the light generating system comprises a plurality of light generating devices.

As indicated above, the light generating system, as described herein, or the lighting device, as described herein, may be used for creating a dynamic dapple effect with light.

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, etc.

The terms "visible", "visible light" or "visible emission" and similar terms refer to light having one or more wavelengths in the range of about 380-780 nm. Herein, UV may especially refer to a wavelength selected from the range of 200-380 nm. The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light. The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm.

In yet a further aspect, the invention provides a lamp or a luminaire comprising the light generating system as defined herein. The luminaire may further comprise a housing, optical elements, louvres, etc. etc. . . . . The lamp or luminaire may further comprise a housing enclosing the first light generating device, the second light generating device, and the optional third light generating device. The lamp or luminaire may comprise a light window in the housing or a housing opening, through which the system light may escape from the housing.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
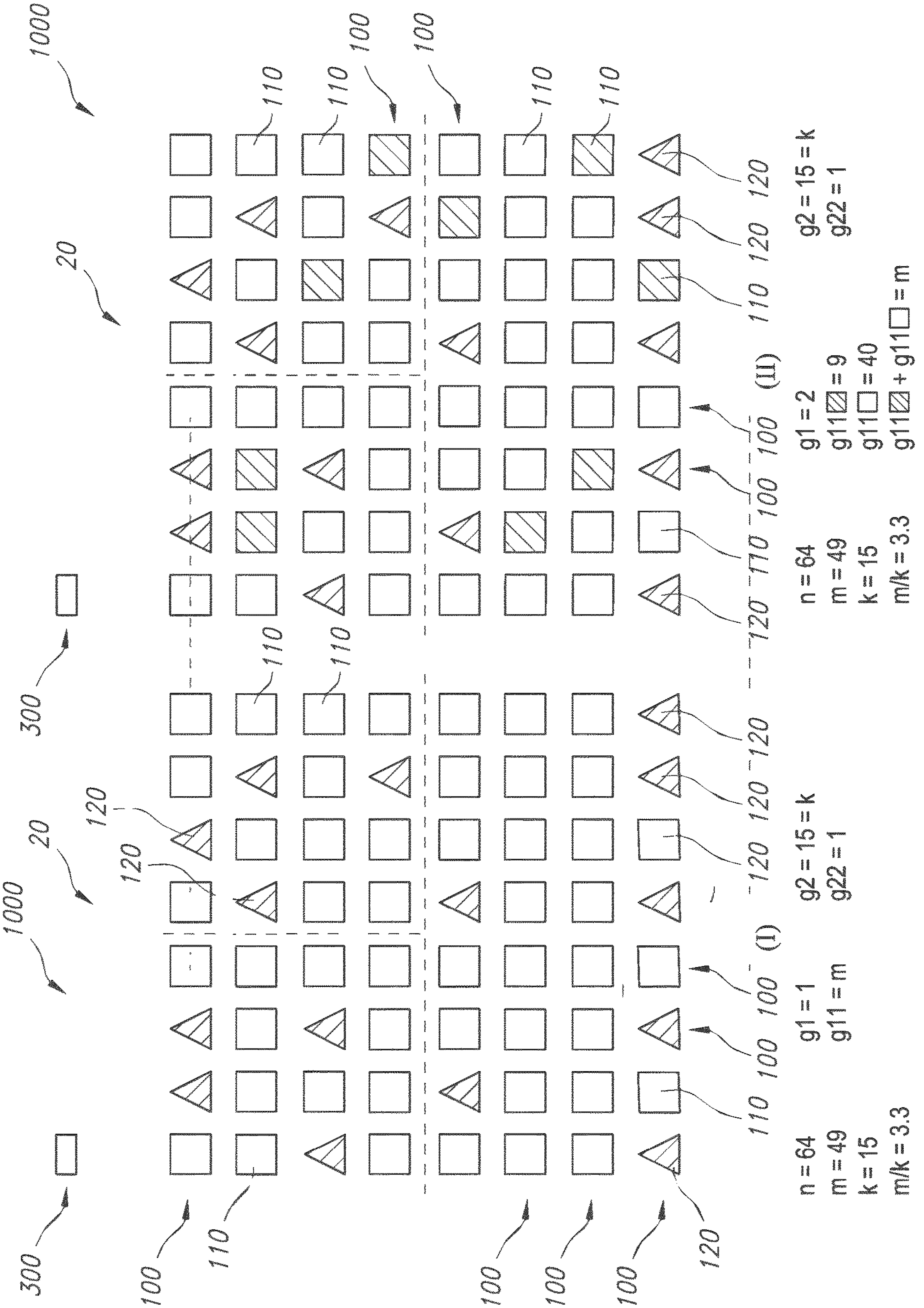
FIG. 1*a*-1*c* schematically depict some aspects in relation to embodiments of arrays.
Figure 1B:
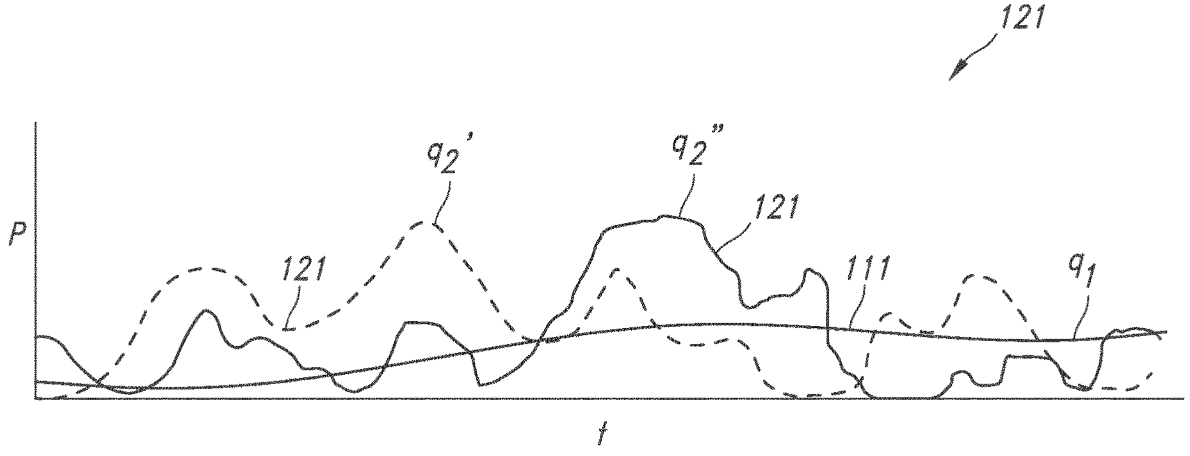

FIGS. 1*a*-1*b* schematically depict four embodiments of arrays 20. Further, light generating devices 100 and a control system 300 are schematically depicted. Hence, FIGS. 1*a*-1*b* also schematically depict four embodiments of a light generating system 1000. In variants I and II references have been indicated; for clarity purposes, this has not been repeated in variants III and IV. The array 20 of n light generating devices 100 comprises m first light generating devices 110 and k second light generating devices 120. Further, the second light generating devices 120 are disposed in an at least partly random arrangement within the array 20 of plurality of light generating devices. In embodiments, $m \geq 10$; $k \geq 3$; and $2 \leq m/k \leq 5$. The first light generating devices 110 are configured to generate first device light 111 (not depicted; see also FIGS. 2*a*-2*b*) and the second light generating devices 120 are configured to generate second device light 121 (not depicted; see also FIGS. 2*a*-2*b*).

In an operational mode: (a) the control system 300 is configured to control $g_1$ first groups of the first light generating devices 110, wherein $1 \leq g_1 \leq b$, wherein $b=g_2$, wherein each first group of the first light generating devices 110 comprises $g_{11}$ first light generating devices 110, wherein $g_{11}$ for each first group is individually selected from the range of $b \leq g_{11} \leq m$, and wherein the sum of all $g_{11}$'s is m; (b) the control system 300 is configured to individually control $g_2$ second groups of the second light generating devices 120, wherein $2 \leq g_2 \leq k$, wherein each second group of the second light generating devices 120 comprises $g_{22}$ second light generating devices 120, wherein $g_{22}$ for each second group is individually selected from the range of $1 \leq g_{22} \leq k-1$, and wherein the sum of all $g_{22}$'s is k; (c) a lighting parameter of the second device light 121 of respective second groups of second light generating devices 120 of q2 second groups of the second light generating devices 120 changes mutually non-synchronically with time, wherein $2 \leq q2 \leq k$.

Referring to variant I, there is a single first group, and there are 15 second groups. The 15 second groups each include a single second light generating device 120 and the single first group includes all first light generating devices 110. Hence, variant I schematically depicts an embodiment of the light generating system 1000 according to claim 1, wherein in the operational mode: (i) the control system 300 is configured to control $g_1$ first groups of the first light generating devices 110, wherein $g_1=1$, wherein the first group of the first light generating devices 110 comprises $g_{11}$ first light generating devices 110, wherein $g_{11}=m$; and (ii) the control system 300 is configured to individually control $g_2$ second groups of the second light generating devices 120, wherein $g_2=k$, wherein each second group of the second light generating devices 120 comprises $g_{22}$ second light generating devices 120, wherein $g_{22}=1$.

By way of examples, four quadrants are depicted, wherein in each quadrant the second light generating devices 120 are randomly positioned. By dividing the array in at least 2, like at least 4, or more areas, and in those areas randomly distributing the second light generating devices 120, a quasi-random distribution may be obtained. Hence, the partly random arrangement of the second light generating devices 120 disposed within the array 20 of plurality of light generating devices 100 may comprise a random arrangement or a quasi-random arrangement.

In variant II, the first group in facts consists of two first groups, one containing 9 first light generating devices 110, and a second first group containing 40 first light generating devices 110. In variant III, which is a variant of variant I, the second group consists of 8 second groups, each comprising two second light generating devices 120, except one second group containing only one second light generating devices 120. Each of these second groups are individually controlled by the control system. Variant IV is a combination of variants II and III. In specific embodiments, $n \geq 40$, wherein $3 \leq m/k \leq -4$, and wherein b=12.

Figure 1C:
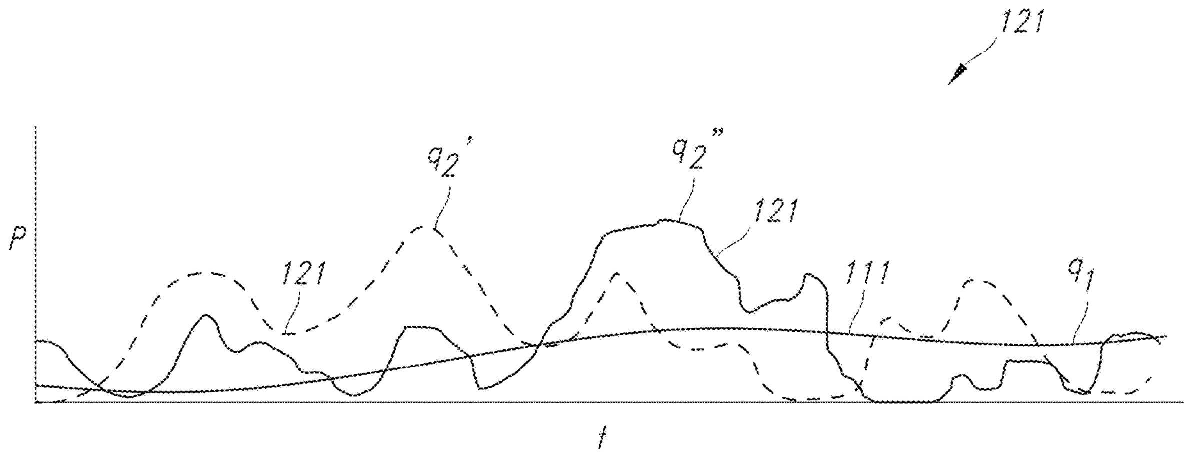

FIG. 1*c* very schematically depicts an embodiment of a time dependence of a lighting parameter p of two second groups $q_2$ indicated with $q_2'$ and $q_2''$. Note that the lighting parameter of the second device light 121 of respective second groups of second light generating devices 120 of q2 second groups of the second light generating devices 120 changes mutually non-synchronically with time. Further, by way of example also a time dependence of the lighting parameter of a single first group $q_{11}$ is depicted. Note that the lighting parameter of the second device light 121 of respective second groups of second light generating devices 120 of q2 second groups of the second light generating devices 120, and of the first device light 111 of respective first groups of first light generating devices of q1 first groups of the first light generating devices, changes mutually non-synchronically with time. In embodiments, the lighting parameter may be selected from the group of (i) intensity and (ii) color point.

In embodiments, the light generating devices 100 comprise solid state light sources. In other embodiments, the light generating system may comprise one or more of DLP, LCD, LCOS and MEMS based arrays. Such system may also provide a plurality of n pixels.

Figure 2A:
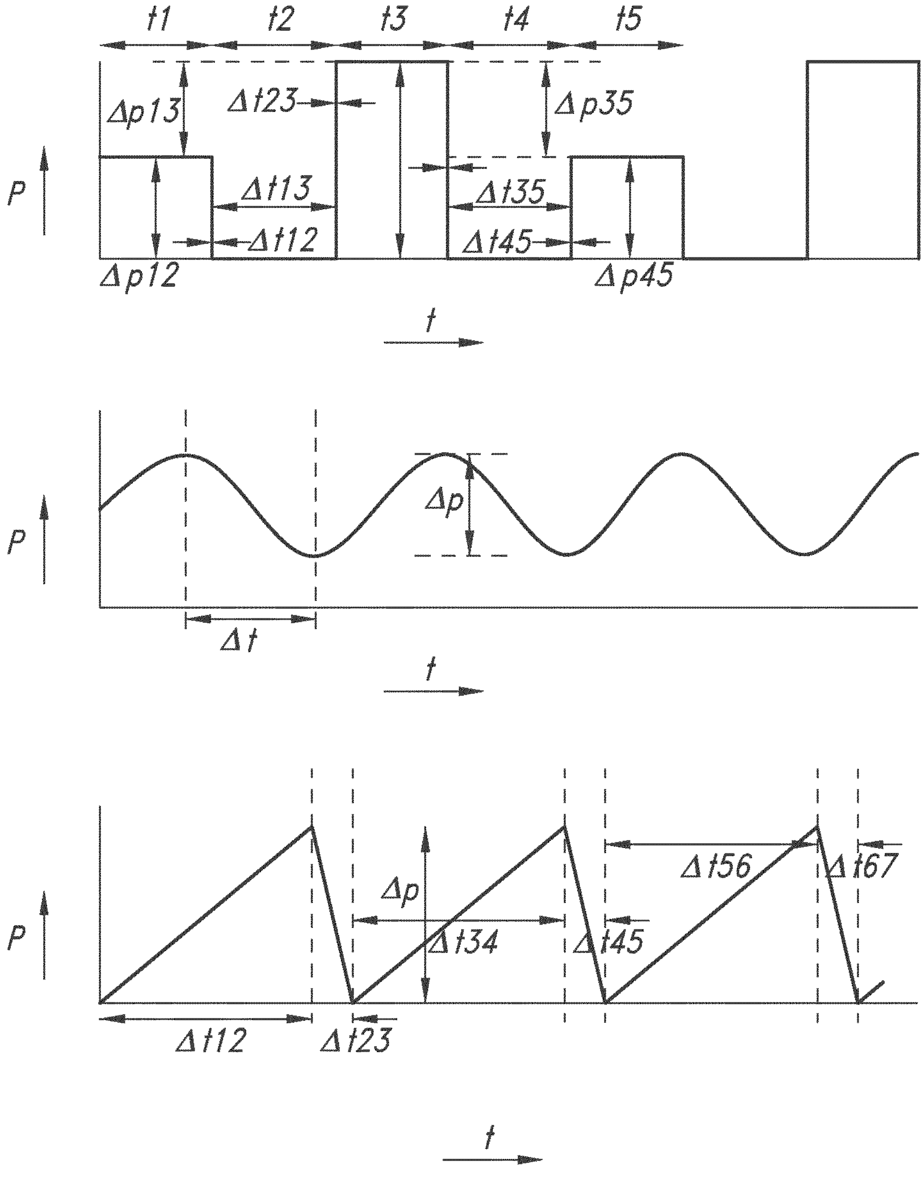
FIGS. 2*a*-2*b* schematically depict some aspects in relation to timing.
Figure 2B:
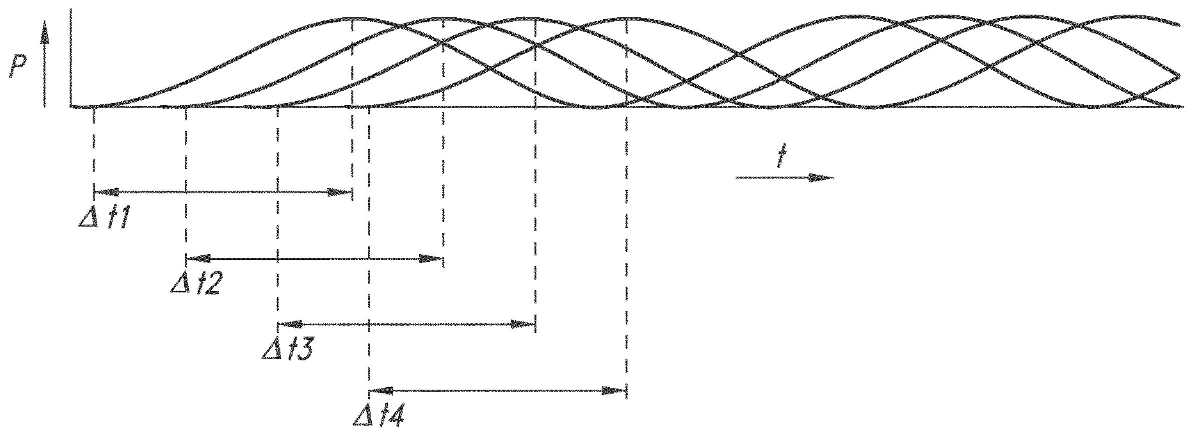

Amongst other referring to the schematic FIG. 1*b*, and also to FIGS. 2*a*-2*b*, during at least part of a first operational mode period of the operational mode the first light sources 110 have a first intensity $I_1$ and one or more of the second light sources 120 have a second intensity $I_2$, wherein $0.75 \leq I_2/I_1 \leq 15$. For instance, in embodiments during the at least part of the first operational mode period $5 \leq I_2/I_1 \leq 15$, like during a sunny day or period. In yet other embodiments, during the at least part of the first operational mode period $0.75 \leq I_2/I_1 \leq 1.5$, like during a cloudy period or day.

In embodiments, during at least part of the first operational mode period of the operational mode the first intensity II and the second intensity $I_2$ differ in temporal behavior.

In (other) embodiments, during at least part of a second operational mode period of the operational mode the first device light 111 and the second device light 121 differ in one or more of (i) intensity and (ii) color point.

Especially, in embodiments the lighting parameter may be an intensity of the second device light 121 of respective second groups of second light generating devices 120 of the q2 second groups of the second light generating devices 120, wherein the intensity has a maximum intensity $I_{max}$, wherein during at least part of a third operational mode period of the operational mode the control system 300 is configured to sequentially vary the intensity of the second device light 121, between a lower intensity and a higher intensity, wherein the lower intensity and the higher intensity differ at least $0.05*I_{max}$, wherein the control system 300 is configured to least partly randomly select the different second light sources and wherein a change from a lower value and a higher value or vice versa is executed in a time period in the range of 0.5 to 300 seconds.

Alternatively or additionally, in embodiments the lighting parameter is a color point of the second device light 121 of respective second groups of second light generating devices 120 of the q2 second groups of the second light generating devices 120, wherein during at least part of a fourth operational mode period of the operational mode the control system 300 is configured to sequentially vary the color point of the second device light 121, between different color points, wherein the different color points at least differ with one or more of i at least 0.03 for u' and ii at least 0.03 for v', wherein the control system 300 is configured to least partly randomly select the different second light sources 120, and wherein a change between the color points is executed in a time period in the range of 0.5 to 300 seconds.

Referring to FIGS. 1*b* and 2*b*, in embodiments the lighting parameter of the second device light 121 of respective second groups of second light generating devices 120 of q2 second groups of the second light generating devices 120 changes mutually non-synchronically with time, between a higher value and a lower value during a time period Δt, wherein Δt for each of the respective q2 second groups of the second light generating devices 120 is individually selected from the ranges of at least 0.5 seconds and at maximum q2*300 seconds.

Figure 3A:
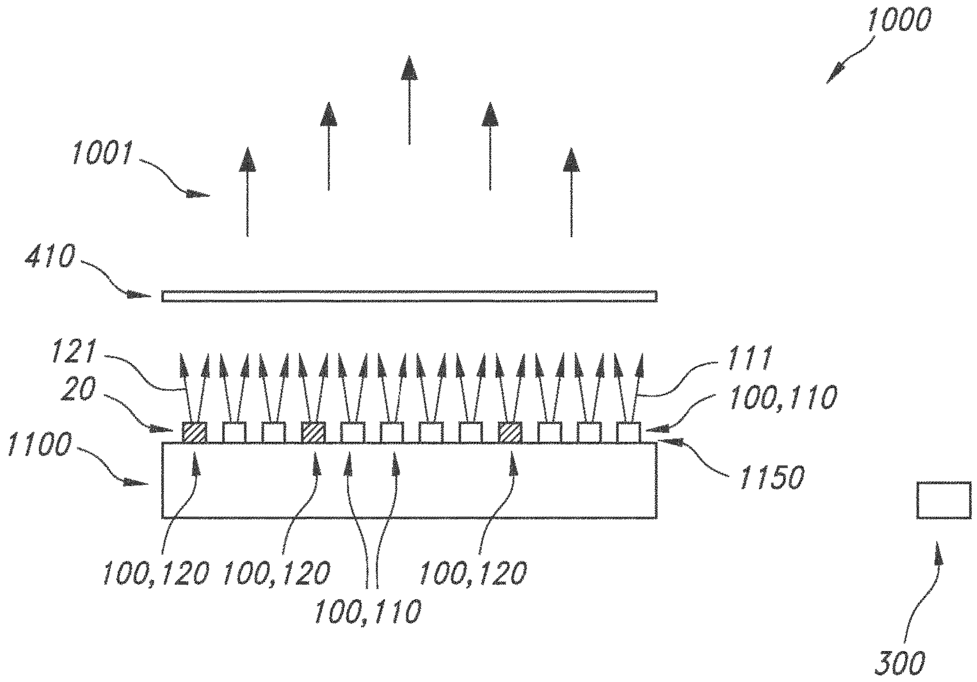
FIGS. 3*a*-3*c* schematically depicts some further aspects.
Figure 3B:
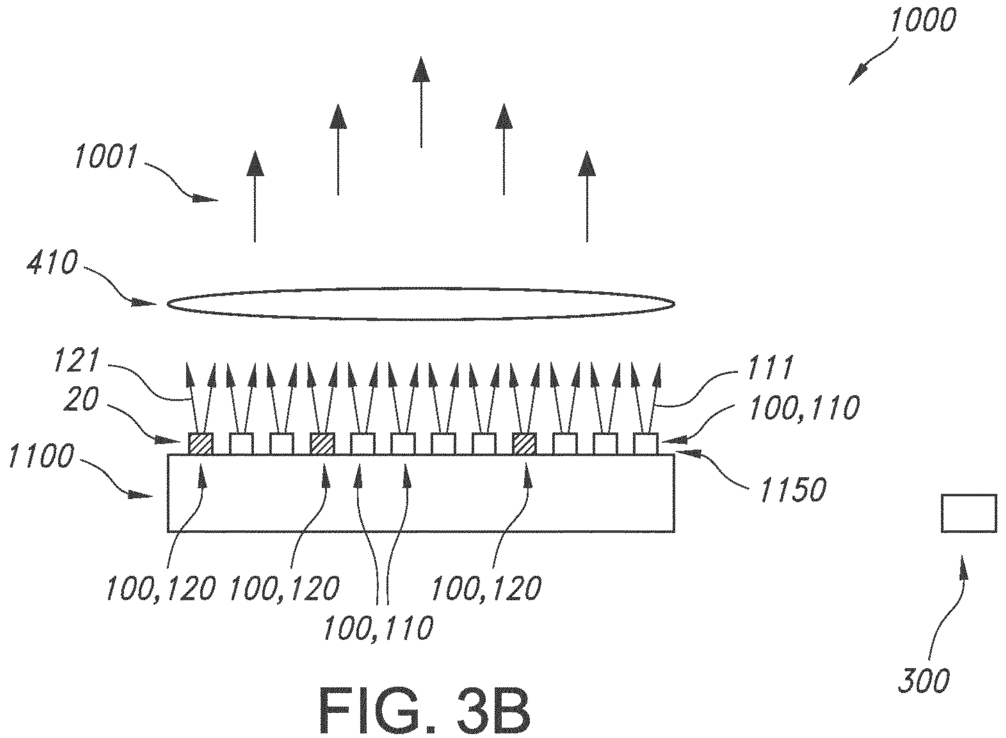

FIGS. 3*a*-3*b* schematically depicts an embodiment of the light generating system 1000. In embodiments, the light generating system 1000 may comprise one or more of (i) a diffuser 410 configured downstream of the light generating devices 100, and (ii) one or more lenses 420 configured downstream of one or more of the light generating devices 100. In embodiments, the light generating system 1000 may comprise a LED chip 1100 with micro-structured pixels 1150, wherein the micro-structured pixels 1150 are defined by the light generating devices 100.

Figure 3C:
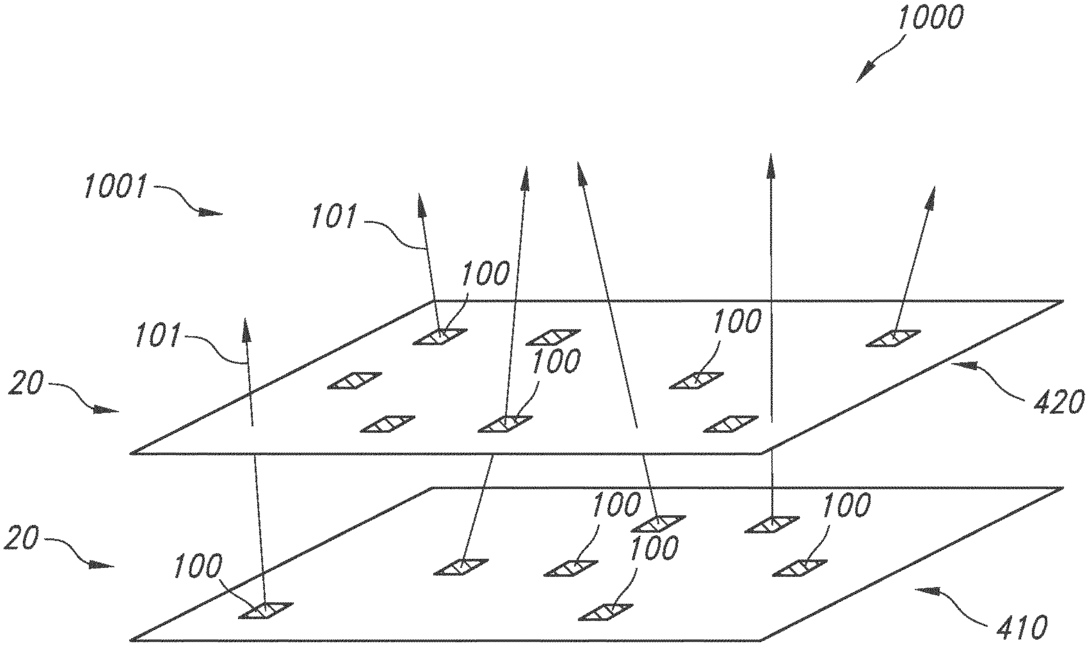

FIG. 3*c* schematically depicts a 3D array 20, with a first layer, 410, such as a reflective carrier, with light generating devices 100, and a second layer 420, such as a light transparent carrier, with light generating devices 100 as well. The first light generating devices and the second light generating devices can be configured at the first layer 410 or second layer 420, respectively, or vice versa. However, it is also possible that one or more first and one or more second light generating devices are configured at the first layer 410 and one or more first and one or more second light generating devices are configured at the second layer 420. Hence, the general indicated light generating devices 100 is used, with reference 101 indicating device light of the light generating devices.

Figure 4A:
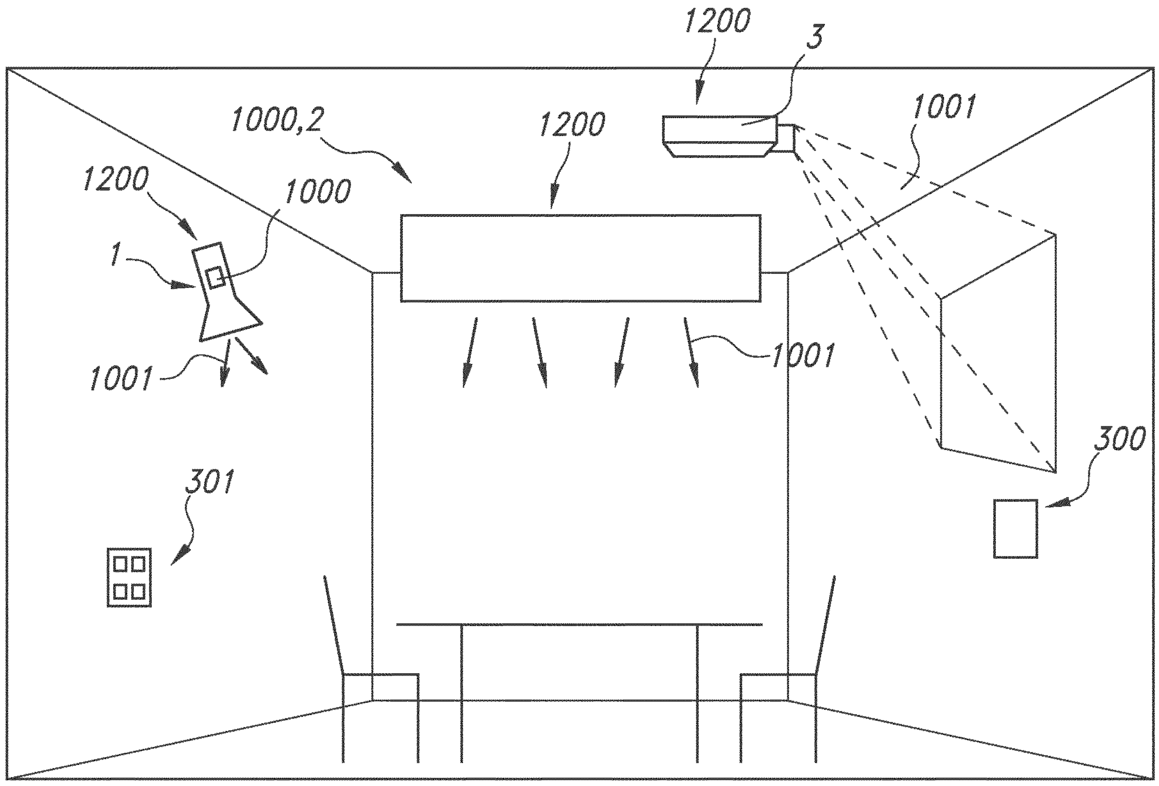
FIGS. 4*a*-4*b* schematically depicts some embodiments and aspects.

FIG. 4*a* schematically depicts embodiments of the lighting device 1200 selected from the group of a lamp 1, a luminaire 2, a projector device 3, comprising the light generating system 1000 as defined herein.

Figure 4B:
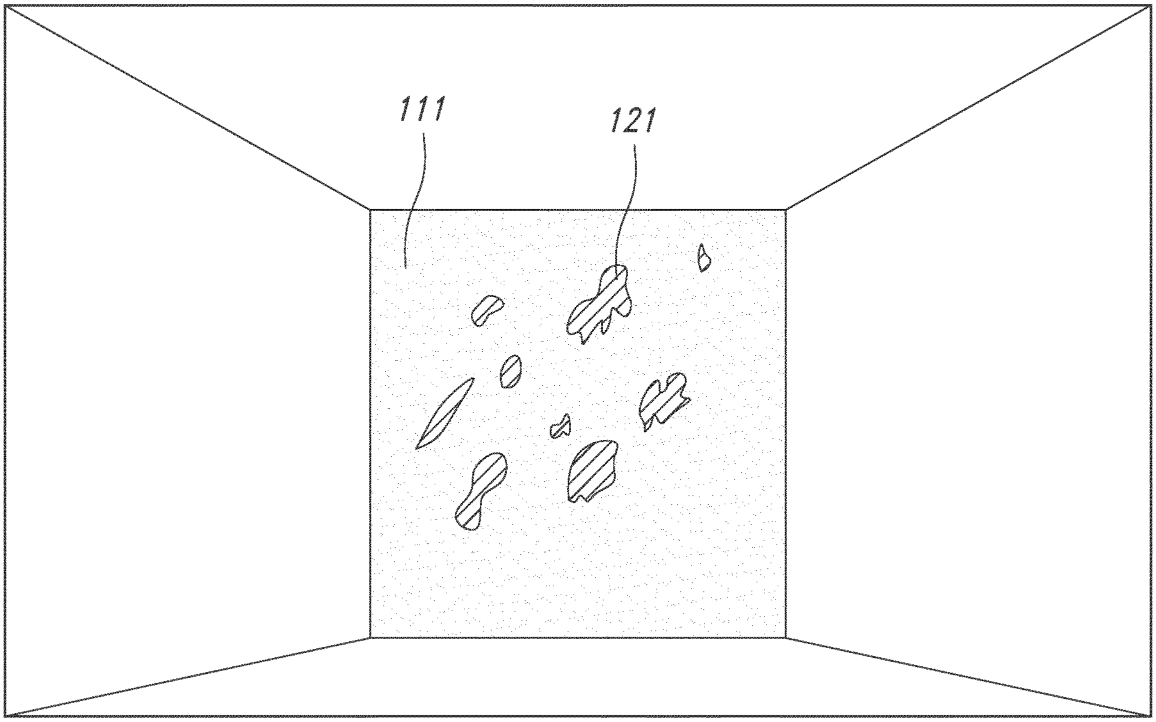

As very schematically depicted in FIG. 4*b*, the light generating system or the light generating device may be used for creating a dynamic dapple effect with light. Here, the result of a projection on a screen or wall is schematically depicted. However, other devices may also be possible.

In below table, some examples are provided:

| Ex. | g1 | Example of function | g2 | Example of function | Remark |
|---|---|---|---|---|---|
| 1 | 1 | Background blue-green of sea | 15 | Sun mirroring on moving waves | FIG. 1a variant I |
| 2 | 1 | Outdoor daylight on wall | 8 | Sun on moving clouds | FIG. 1b variant III |
| 3 | 2 | Background blue-green of sea, wherein the color of the sea spatially changes due to differences in depth | 15 | Sun mirroring on moving waves | FIG. 1a variant II |
| 4 | 2 | Outdoor daylight on wall, but partially hindered by (a) trees | 8 | Sun on moving clouds, and through moving leaves | FIG. 1b variant IV |
| 5 | 8 | Outdoor perception with color change of the sky from light blue to deep blue | 16 | Sun on moving clouds | |

In these examples, e.g. q2 may be k, and q1 may be g1, though other embodiments may also be possible. Further, in these examples a display or projection on a screen (such as a wall) may be assumed.

In below table, some further examples are provided:

| Ex. | m/k | Perception | Reduction in complexity | Remark |
|---|---|---|---|---|
| 6 | 0.5 | Overkill of controlled pixels | Marginal | Less balance between perception and reduction in complexity |

-continued

| Ex. | m/k | Perception | Reduction in complexity | Remark |
|---|---|---|---|---|
| 7 | 1 | Less overkill of controlled pixels | Some reduction | Acceptable |
| 8 | 2 | Slight overkill of active pixels | Better than previous example | optimum |
| 9 | 4 | Good balance between controlled and uncontrolled pixels | Better than previous example | optimum |
| 10 | 5 | Good balance between controlled and uncontrolled pixels | Better than previous example | optimum |
| 11 | 8 | Slight under presence of controlled pixels for some light scenes | Better than previous example | Acceptable |
| 12 | 10 | At the border for specific light scenes | Better than previous example | Acceptable |
| 13 | 12 | Dedicated light scene only | Better than previous example | Less balance between perception and reduction in complexity |

Perception may indicate how realistic the scene may be perceived by an educated control panel. Note that perception and complexity are not necessarily linear scales.

The term "plurality" refers to two or more. The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising an array of n light generating devices, wherein n≥20, and a control system configured to control the light generating devices, wherein:

the array of n light generating devices comprises m first light generating devices and k second light generating devices; wherein the second light generating devices are disposed in an at least partly random arrangement within the array of plurality of light generating devices;

wherein $m \geq 10$; $k \geq 3$; and $2 \leq m/k \leq 5$; wherein the first light generating devices are configured to generate first device light and wherein the second light generating devices are configured to generate second device light;

in an operational mode:

the control system is configured to control $g_1$ first groups of the first light generating devices, wherein $1 \leq g_1 < b$, wherein $b = g_2$, wherein each first group of the first light generating devices comprises $g_{11}$ first light generating devices, wherein $g_{11}$ for each first group is individually selected from the range of $b \leq g_{11} \leq m$, and wherein the sum of all $g_{11}$'s is m;

the control system is configured to individually control $g_2$ second groups of the second light generating devices, wherein $2 \leq g_2 \leq k$, wherein each second group of the second light generating devices comprises $g_{22}$ second light generating devices, wherein $g_{22}$ for each second group is individually selected from the range of $1 \leq g_{22} \leq k-1$, and wherein the sum of all $g_{22}$'s is k;

a lighting parameter of the second device light of respective second groups of second light generating devices of q2 second groups of the second light generating devices changes mutually non-synchronically with time, wherein $2 \leq q2 \leq k$.

2. The light generating system according to claim 1, wherein the lighting parameter is selected from the group of intensity and color point, wherein the light generating devices comprise solid state light sources, and wherein the partly random arrangement comprises a random arrangement or a quasi-random arrangement.

3. The light generating system according to claim 1, wherein in the operational mode:

the control system is configured to control $g_1$ first groups of the first light generating devices, wherein $g_1 = 1$, wherein the first group of the first light generating devices comprises $g_{11}$ first light generating devices, wherein $g_{11} = m$; and the control system is configured to individually control $g_2$ second groups of the second light generating devices, wherein $g_2 = k$, wherein each second group of the second light generating devices comprises $g_{22}$ second light generating devices, wherein $g_{22} = 1$.

4. The light generating system according to claim 1, wherein $n \geq 40$, wherein $3 \leq m/k \leq 4$, and wherein $b = 12$.

5. The light generating system according to claim 1, wherein during at least part of a first operational mode period of the operational mode the first light sources have a first intensity $I_1$ and one or more of the second light sources have a second intensity $I_2$, wherein $0.75 \leq I_2/I_1 \leq 15$.

6. The light generating system according to claim 5, wherein during the at least part of the first operational mode period $5 \leq I_2/I_1 \leq 15$.

7. The light generating system according to claim 5, wherein during the at least part of the first operational mode period $0.75 \leq I_2/I_1 \leq 1.5$.

8. The light generating system according to claim 5, wherein during at least part of the first operational mode period of the operational mode the first intensity $I_1$ and the second intensity $I_2$ differ in temporal behavior.

9. The light generating system according to claim 1, wherein during at least part of a second operational mode period of the operational mode the first device light and the second device light differ in one or more of intensity and color point.

10. The light generating system according to claim 1, wherein the lighting parameter is an intensity of the second device light of respective second groups of second light generating devices of the q2 second groups of the second light generating devices, wherein the intensity has a maximum intensity $I_{max}$, wherein during at least part of a third operational mode period of the operational mode the control system is configured to sequentially vary the intensity of the second device light, between a lower intensity and a higher intensity, wherein the lower intensity and the higher intensity differ at least $0.05 * I_{max}$, wherein the control system is configured to least partly randomly select the different second light sources and wherein a change from a lower value and a higher value or vice versa is executed in a time period in the range of 0.5 to 300 seconds.

11. The light generating system according to claim 1, wherein the lighting parameter is a color point of the second device light of respective second groups of second light generating devices of the q2 second groups of the second light generating devices, wherein during at least part of a fourth operational mode period of the operational mode the control system is configured to sequentially vary the color point of the second device light, between different color points, wherein the different color points at least differ with one or more of at least 0.03 for u' and at least 0.03 for v', wherein the control system is configured to least partly randomly select the different second light sources, and wherein a change between the color points is executed in a time period in the range of 0.5 to 300 seconds.

12. The light generating system according to claim 1, wherein the lighting parameter of the second device light of respective second groups of second light generating devices of q2 second groups of the second light generating devices changes mutually non-synchronically with time, between a higher value and a lower value during a time period $\Delta t$, wherein $\Delta t$ for each of the respective q2 second groups of the second light generating devices is individually selected from the ranges of at least 0.5 seconds and at maximum $q2 * 300$ seconds.

13. The light generating system according to claim 1, comprising one or more of a diffuser configured downstream of the light generating devices, and one or more lenses configured downstream of one or more of the light generating devices.

14. A lighting device selected from the group of a lamp, a luminaire, a projector device comprising the light generating system according to claim 1.

15. Use of the light generating system according to claim 1 for creating a dynamic dapple effect with light.

* * * * *